US010790494B2

(12) United States Patent
Sato et al.

(10) Patent No.: US 10,790,494 B2
(45) Date of Patent: Sep. 29, 2020

(54) BATTERY WIRING MODULE INCLUDING A TERMINAL ACCOMMODATION PORTION

(71) Applicant: SUMITOMO WIRING SYSTEMS, LTD., Mie (JP)

(72) Inventors: Hiroshi Sato, Mie (JP); Ryota Mori, Mie (JP); Hisayoshi Yaita, Mie (JP); Masami Suzuki, Mie (JP); Kenta Sawai, Mie (JP)

(73) Assignee: SUMITOMO WIRING SYSTEM, LTD., Mie (JP)

( * ) Notice: Subject to any disclaimer, the term of this patent is extended or adjusted under 35 U.S.C. 154(b) by 0 days.

(21) Appl. No.: 16/541,698

(22) Filed: Aug. 15, 2019

(65) Prior Publication Data
US 2020/0075918 A1    Mar. 5, 2020

(30) Foreign Application Priority Data

Aug. 29, 2018 (JP) .................................. 2018-160511

(51) Int. Cl.
| H01R 25/16 | (2006.01) |
| H01M 2/20 | (2006.01) |
| H01R 13/533 | (2006.01) |
| H01R 13/52 | (2006.01) |
| H01R 13/50 | (2006.01) |

(52) U.S. Cl.
CPC .......... *H01M 2/206* (2013.01); *H01R 25/162* (2013.01); *H01M 2220/20* (2013.01); *H01R 13/501* (2013.01); *H01R 13/5213* (2013.01); *H01R 13/533* (2013.01)

(58) Field of Classification Search
CPC . H01R 13/533; H01R 13/5213; H01R 13/501
See application file for complete search history.

(56) References Cited

U.S. PATENT DOCUMENTS

| 5,001,300 | A | * | 3/1991 | Messelhi | ................ | H02G 3/083 |
| | | | | | | 174/138 F |
| 5,439,759 | A | * | 8/1995 | Lippert | ................... | H01M 2/32 |
| | | | | | | 174/138 F |
| 7,470,151 | B2 | * | 12/2008 | Yamaguchi | ............ | H01R 4/185 |
| | | | | | | 439/417 |
| 8,436,247 | B2 | * | 5/2013 | Mase | ....................... | H01R 4/34 |
| | | | | | | 174/135 |

FOREIGN PATENT DOCUMENTS

JP        2014-146489        8/2014

* cited by examiner

*Primary Examiner* — Tho D Ta
(74) *Attorney, Agent, or Firm* — Greenblum & Bernstein, P.L.C.

(57) ABSTRACT

A housing is provided with a terminal accommodation portion accommodating a module-side terminal and having an opening through which the module-side terminal is introduced. The terminal accommodation portion includes a bottom portion and a third wall portion serving as an accommodation-side regulating portion that regulates displacement of the module-side terminal. A cover that seals the opening of the terminal accommodation portion includes first and second regulating wall portions serving as a cover-side regulating portion that regulates displacement of the module-side terminal at a different position from that of the bottom portion and the third wall portion.

6 Claims, 7 Drawing Sheets

BATTERY WIRING MODULE INCLUDING A TERMINAL ACCOMMODATION PORTION

CROSS-REFERENCE TO RELATED APPLICATIONS

The present application claims priority under 35 U.S.C. § 119 of Japanese Application No. 2018-160511, filed on Aug. 29, 2018, the disclosure of which is expressly incorporated by reference herein in its entirety.

BACKGROUND OF THE INVENTION

1. Field of the Invention

The present invention relates to a battery wiring module.

2. Description of Related Art

For example, in a vehicle such as an electric automobile or hybrid automobile, a battery wiring module is mounted on a high-voltage secondary battery that is installed as a power source for travel drive. In the battery wiring module, module-side terminals for detecting voltage are connected to bus bars that connect a plurality of battery cells configuring the secondary battery to each other (see, for example, Japanese Patent Laid-open Publication No. 2014-146489). In the battery wiring module, the module-side terminal is fixed in place by a regulating portion (lock portion) that is provided to a terminal accommodation portion which accommodates the module-side terminal.

SUMMARY OF THE INVENTION

However, there is a risk that positional shifting of the terminal may occur when using only a regulating portion provided to the terminal accommodation portion. In order to resolve this issue, the present invention provides a battery wiring module that can inhibit positional shifting of a terminal.

A battery wiring module resolving the above-noted issue includes a module-side terminal that is electrically connected to a bus bar that connects battery terminals of a plurality of battery cells to each other, a wire having one end connected to the module-side terminal, and a housing that accommodates the wire and the module-side terminal. The housing is provided with a terminal accommodation portion accommodating the module-side terminal and having an opening through which the module-side terminal is introduced. The housing includes regulating portions that regulate displacement of the module-side terminal on both the terminal accommodation portion and a cover that seals the opening of the terminal accommodation portion.

According to this aspect, positional shifting of the terminal can be inhibited by having regulating portions on both the cover and the terminal accommodation portion. In the battery wiring module described above, preferably, the housing includes the terminal accommodation portion that accommodates the module-side terminal; the terminal accommodation portion includes an opening which is capable of exposing a forefront end portion of the module-side terminal to an exterior, as well as the accommodation-side regulating portion that can abut the module-side terminal in an opening direction on the opening side; and the cover includes the cover-side regulating portion that can abut the module-side terminal in a direction that intersects with the opening direction of the opening.

According to this aspect, by including the accommodation-side regulating portion, which can abut the module-side terminal in the opening direction on the opening side, and the cover-side regulating portion, which can abut the module-side terminal in the direction that intersects with the opening direction of the opening, regulation from multiple directions becomes possible and positional shifting of the terminal can be inhibited.

In the battery wiring module described above, preferably, the terminal accommodation portion includes the accommodation-side regulating portion having a pin shape that extends from a bottom portion of the terminal accommodation portion and can be inserted through a hole in the module-side terminal; and the cover includes the cover-side regulating portion that regulates the module-side terminal from slipping off of the accommodation-side regulating portion.

According to this aspect, positional shifting of the module-side terminal in an extension direction of the pin shape and a direction orthogonal to the extension direction can be inhibited by the pin-shaped accommodation-side regulating portion that is inserted through the hole in the module-side terminal and the cover-side regulating portion that regulates the module-side terminal from slipping off of the accommodation-side regulating portion.

In the battery wiring module described above, preferably, the regulating cover is configured to be integral with the housing. According to this aspect, by configuring the cover to be integral with the housing, an increase in the number of components can be inhibited.

According to the battery wiring module according to the present invention, positional shifting of a terminal can be inhibited.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
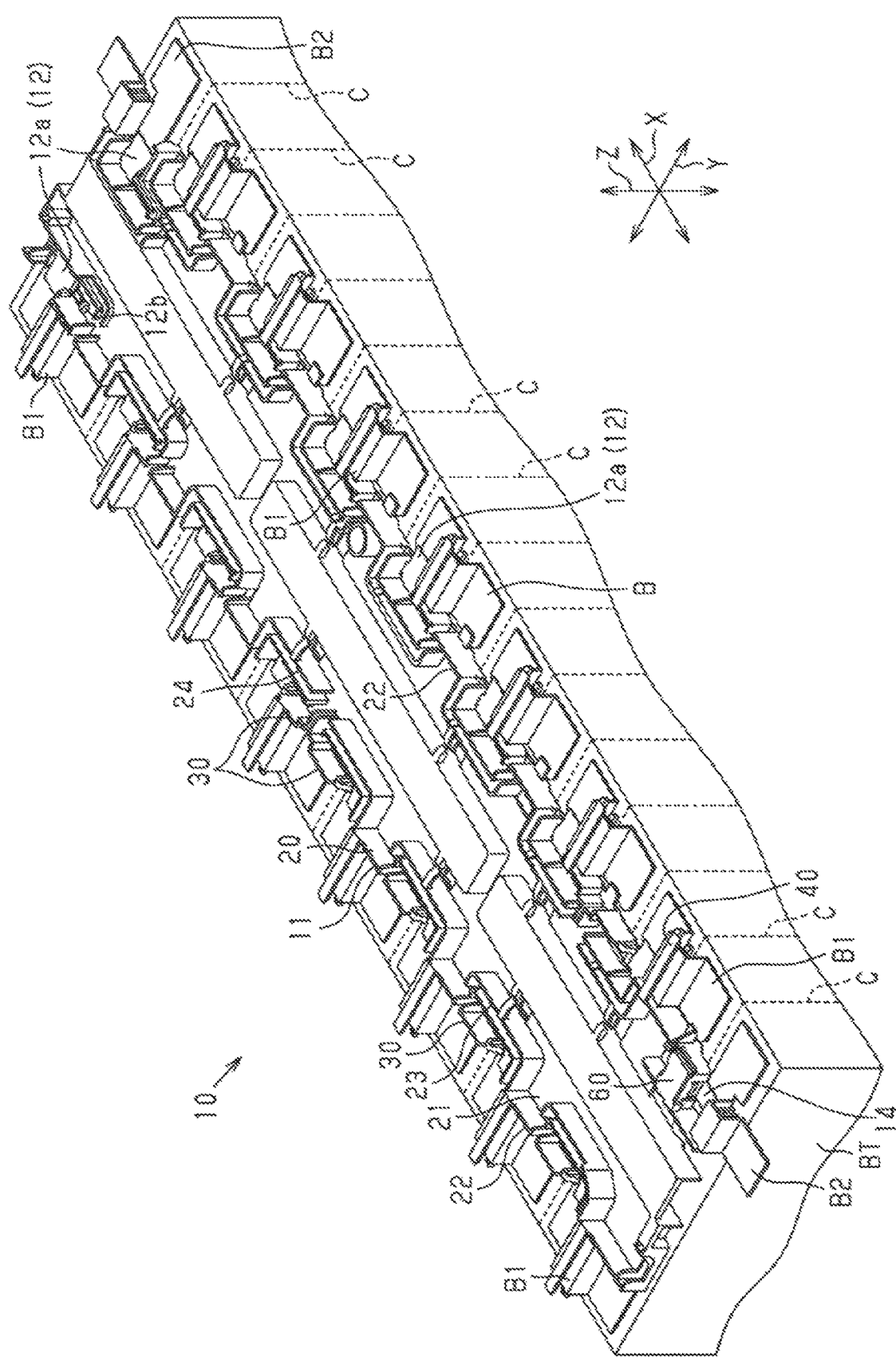
FIG. 1 is a perspective view of a battery wiring module according to an embodiment.
Figure 2:
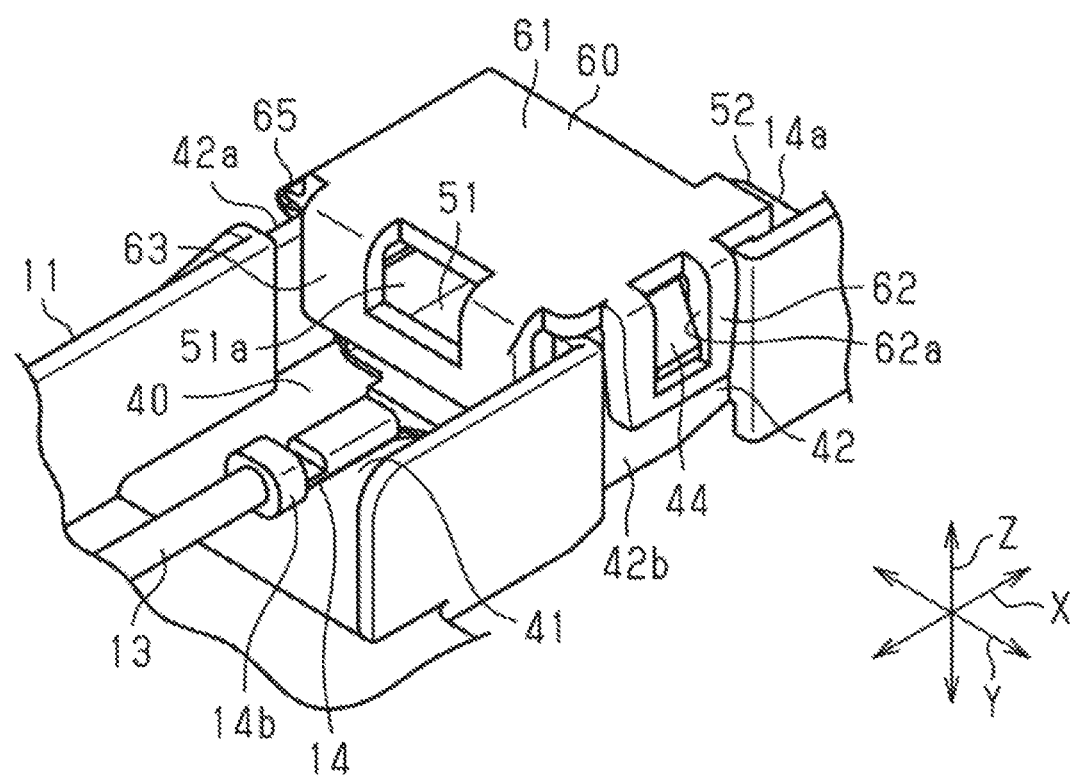
FIG. 2 is a perspective view of a portion of the battery wiring module according to the same embodiment.
Figure 3:
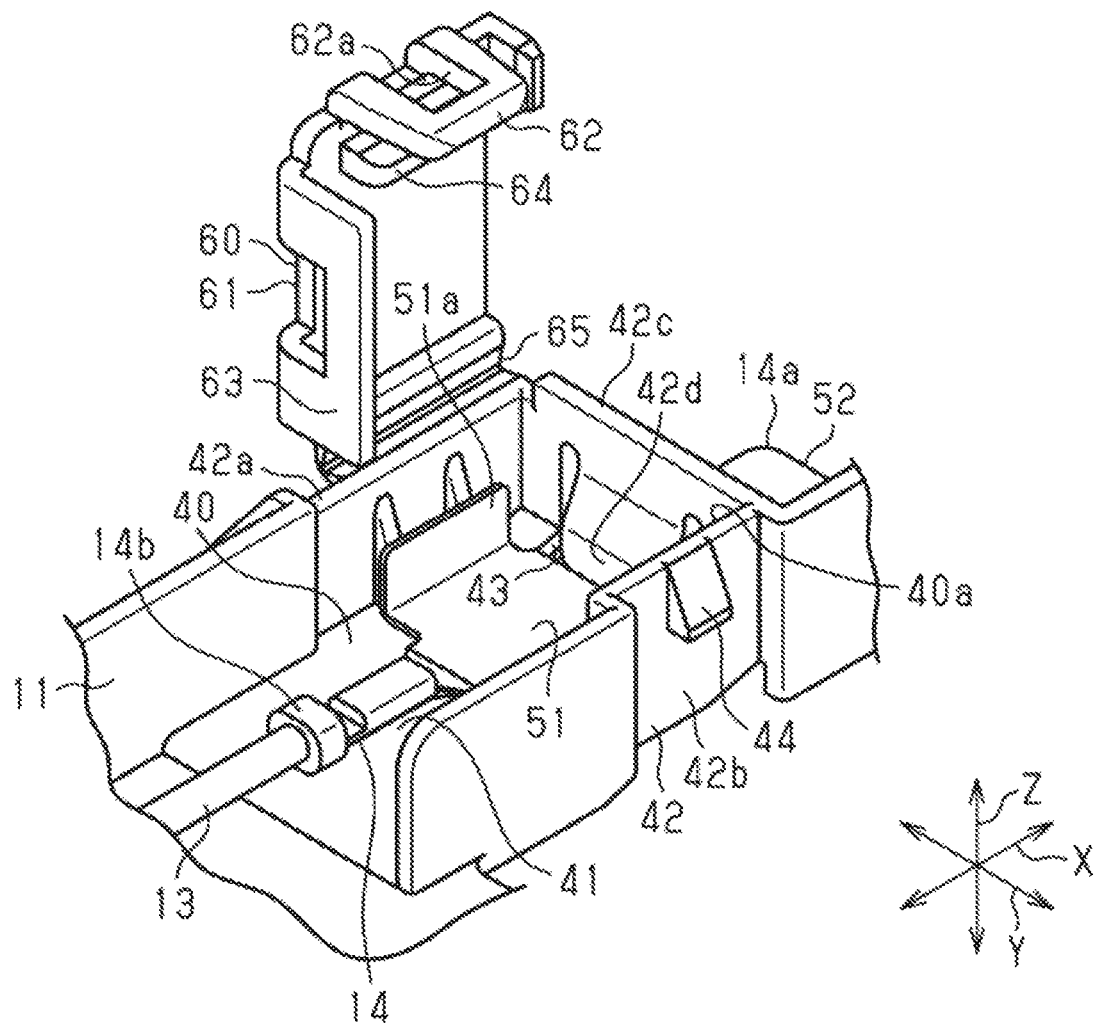
FIG. 3 is a perspective view of a portion of the battery wiring module according to the same embodiment.
Figure 4:
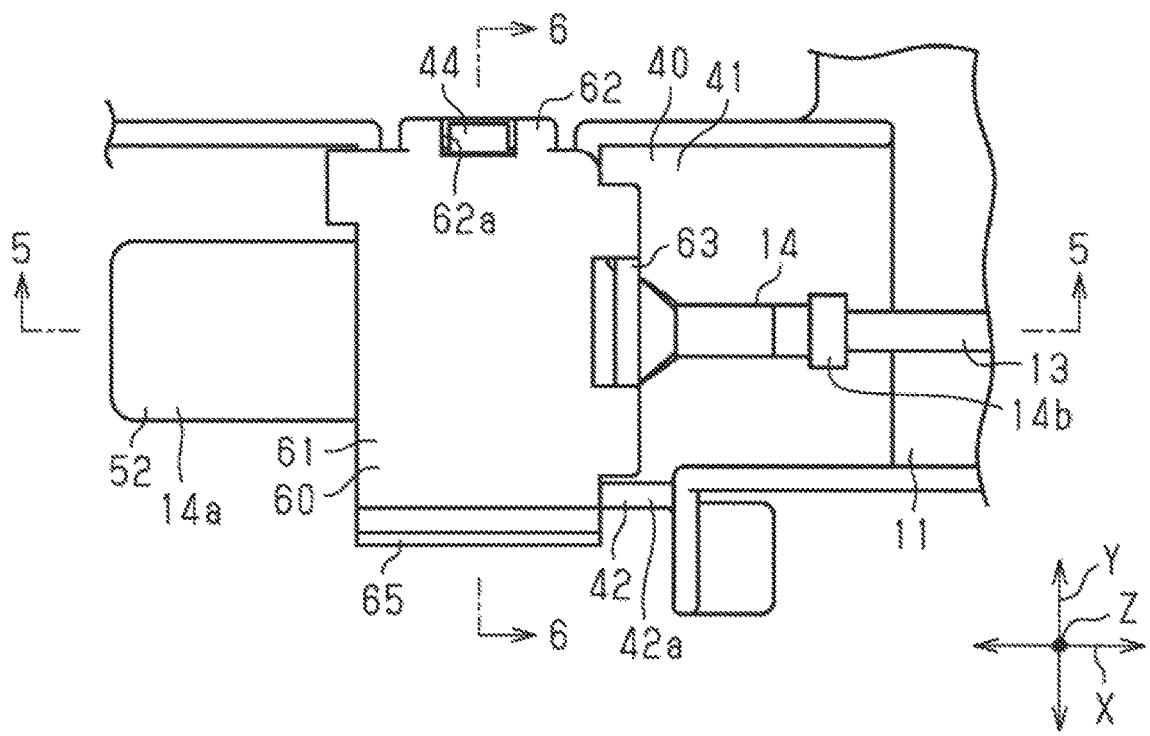
FIG. 4 is a plan view of a portion of the battery wiring module according to the same embodiment.
Figure 5:
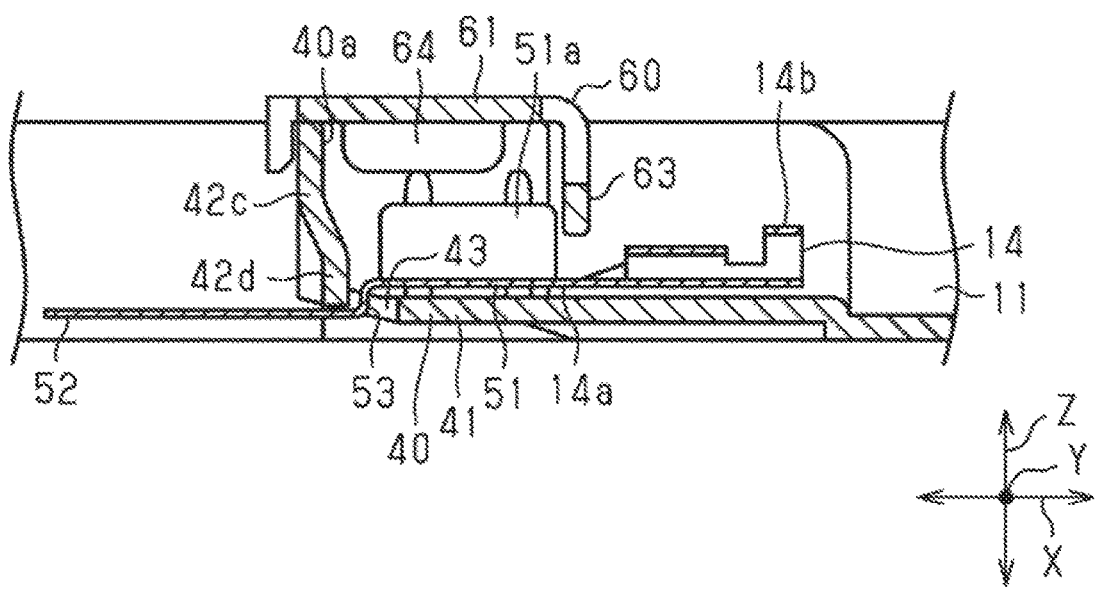
FIG. 5 is a cross-sectional view along a line 5-5 in FIG. 4.
Figure 6:
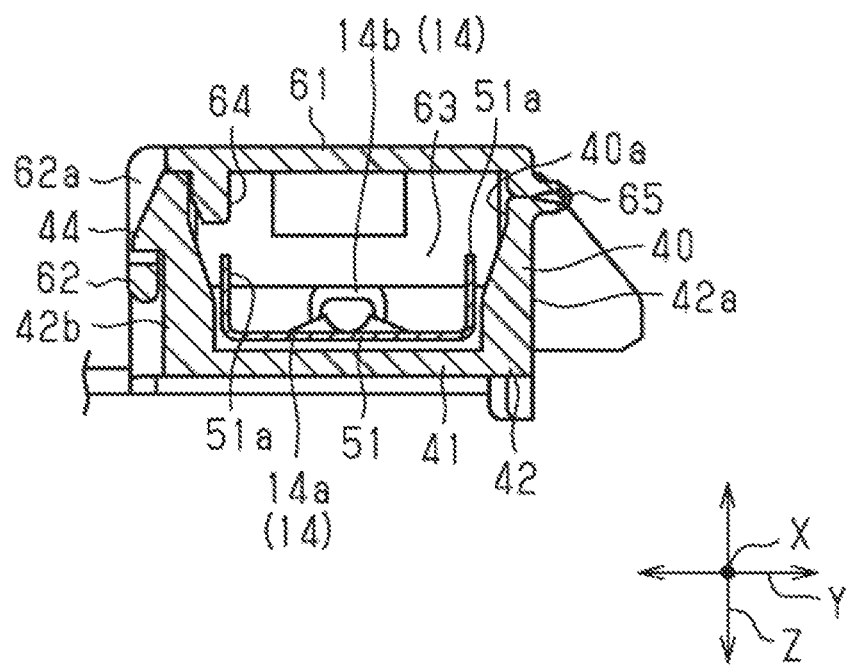
FIG. 6 is a cross-sectional view along a line 6-6 in FIG. 4.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of a battery wiring module is described. In the drawings, portions of the configuration may be exaggerated or simplified for ease of illustration. Also, dimension proportions for various portions may differ from a real case.

As illustrated in FIG. 1, a battery wiring module 10 is mounted on a top surface of a secondary battery BT that has a substantially rectangular parallelepiped shape. The secondary battery BT is installed in an electric automobile, a hybrid automobile, or the like, and supplies electric power to a travel motor of the vehicle. In addition, the secondary battery BT receives a supply of electric power from the travel motor or a power generating motor in accordance with a charging status or vehicle operation status. Here, in the description that follows, with respect to three mutually perpendicular directions X, Y, and Z in FIG. 1, the X direction is described as a direction in which battery cells are aligned, the Y direction is described as a width direction of the battery wiring module, and the Z direction is described as a vertical direction.

The secondary battery BT is provided with a plurality of battery cells C, and a positive electrode terminal and negative electrode terminal (not shown in the drawings) of each battery cell C face toward the battery wiring module 10 (upward). The battery cells C are arranged aligned in the X direction. At this point, the battery cells C are lined up so as to switch alternatingly between positive electrode terminals and negative electrode terminals as battery terminals in an alignment direction of the battery cells C (i.e., the X direction). Each terminal is equipped with bus bars B1 and B2 which connect neighboring terminals (i.e., positive electrode terminals and negative electrode terminals) to each other. In other words, each battery cell C is serially connected by the bus bars B1 and B2. The bus bars B1 and B2 according to this example are connected to the positive electrode terminals and negative electrode terminals of the battery cells C by welding, for example.

The secondary battery BT is provided with the plurality of battery cells C, and the positive electrode terminal and negative electrode terminal (not shown in the drawings) of each battery cell C face toward the battery wiring module 10 (upward). The battery cells C are arranged aligned in the X direction. At this point, the battery cells C are lined up so as to switch alternatingly between the positive electrode terminals and negative electrode terminals as the battery terminals in the alignment direction of the battery cells C (i.e., the X direction). Each terminal is equipped with the bus bars B1 and B2 which connect neighboring terminals (i.e., positive electrode terminals and negative electrode terminals) to each other. In other words, each battery cell C is serially connected by the bus bars B1 and B2. The bus bars B1 and B2 according to this example are connected to the positive electrode terminals and negative electrode terminals of the battery cells C by welding, for example.

A housing 11 is configured with a resin member, for example. The housing 11 includes a wire accommodation portion 20 that accommodates a wire 13, and terminal accommodation portions 30 and 40 that accommodate module-side terminals 12 and 14.

As illustrated in FIGS. 1 to 6, the module-side terminals 12 and 14 respectively include a flat plate-shaped terminal main body 12a and 14a, and a substantially tubular barrel portion 12b and 14b that is continuous from the terminal main body 12a and 14a. The barrel portion 12b and 14b is electrically connected to a core wire of the wire 13. Furthermore, the module-side terminal 12 according to the present example is configured such that the terminal main body 12a protrudes in the Y direction and forms substantially an "L" shape with respect to the X direction, which is a length direction of the substantially tubular barrel portion 12b. Meanwhile, the module-side terminal 14 is provided to an X direction end portion and has a straight shape in which the terminal main body 14a and the barrel portion 14b are continuous in the X direction, which is the length direction of the barrel portion 14b. The module-side terminal 14 is connected to one of the bus bars B2 used for power source extraction, which are provided to both X-direction ends. Among the plurality of battery cells C, the bus bars B2 for power source extraction are connected to the positive electrode terminal or negative electrode terminal of the battery cells C that are positioned at both X-direction end portions. That is, the bus bar B2 on one X-direction side is connected to the positive electrode terminal of the battery cell C that is provided nearest the bus bar B2, and the bus bar B2 on the other X-direction side is connected to the negative electrode terminal of the battery cell C that is provided nearest the bus bar B2. Each of the bus bars B2 are configured to have substantially an "L" shape when viewed in the Z direction, and one end portion of the bus bar B2 is drawn out in the X direction.

As illustrated in FIG. 1, the wire accommodation portion 20 of the housing 11 is divided, within the housing 11, into a bottom portion 21 and a side wall 22 that extends from an outer edge of the bottom portion 21. The wire accommodation portion 20 includes a plurality of recesses 23 and 24 in the direction in which the plurality of battery cells C are aligned. The recesses 23 and 24 are concave in a direction orthogonal to the direction in which the plurality of battery cells C are aligned and orthogonal to a layering direction of the housing 11 onto the battery cells C, i.e., the recesses 23 and 24 are concave in the width direction Y. One terminal accommodation portion 30 is provided to each recess 23. Two terminal accommodation portions 30 are provided to each recess 24.

As illustrated in FIG. 1, the terminal accommodation portion 30 of the housing 11 that is accommodated in the recesses 23 and 24 is configured to have a substantially rectangular parallelepiped shape that is long in the X direction. As illustrated in FIGS. 1 to 6, much like the terminal accommodation portion 30, the terminal accommodation portion 40 that accommodates the module-side terminal 14 that is positioned at the X-direction end portion includes a bottom portion 41 and a side wall 42 that extends from an outer edge of the bottom portion 41.

The side wall 42 includes a first wall portion 42a, a second wall portion 42b, and a third wall portion 42c. The first wall portion 42a and the second wall portion 42b face each other in the Y direction. The third wall portion 42c faces in the X direction and connects the first wall portion 42a with the second wall portion 42b. In addition, the third wall portion 42c includes a cut-out elastic piece 42d. An opening 43 is formed between the third wall portion 42c and the bottom portion 41, and a portion of the terminal main body 14a of the module-side terminal 14 is exposed outside the housing 11 through this opening 43.

The terminal main body 14a of the module-side terminal 14 includes a first flat plate portion 51, a second flat plate portion 52 serving as a forefront end portion, and a stepped portion 53 having a height difference and connecting the flat plate portions 51 and 52 to each other. The first flat plate portion 51 is configured to be continuous from the barrel portion 14b and to have a substantially square plate shape.

A pair of flanges 51a are formed on the first flat plate portion 51, the flanges 51a projecting in a direction (Z direction) that is substantially orthogonal to a surface direction of the first flat plate portion 51 due to a bending process, for example. Each of the flanges 51a face each other in the Y direction.

The stepped portion 53 connects a space between a leading edge portion of the first flat plate portion 51 and a base end portion of the second flat plate portion 52 such that there is a height difference in the Z direction between the first flat plate portion 51 and the second flat plate portion 52, for example. In the present example, the stepped portion 53 extends in a direction that is substantially orthogonal to the surface directions of the first flat plate portion 51 and the second flat plate portion 52.

The second flat plate portion 52 is configured to have a substantially flat plate shape and is exposed to the exterior through the opening 43. The second flat plate portion 52 is connected to the bus bar B1 by welding, for example. In this example, in a state where the module-side terminal 14 is accommodated in the terminal accommodation portion 40, the stepped portion 53 can abut the bottom portion 41 and the third wall portion 42c (elastic piece 42d) in the X direction, which is an opening direction of the opening 43. In addition, in a state where the module-side terminal 14 is accommodated in the terminal accommodation portion 40, the second flat plate portion 52 can abut the third wall portion 42c (elastic piece 42d) in the Z direction, which is a direction orthogonal to the opening direction. Therefore, positional shifting of the module-side terminal 14 is inhibited. That is, the bottom portion 41 and the third wall portion 42c serve as accommodation-side regulating portions.

The terminal accommodation portion 40 configured as described above includes a cover 60 that seals an opening 40a in the top of the terminal accommodation portion 40. The cover 60 includes a cover main body 61 having a substantially square plate shape, an engagement portion 62, a first regulating wall portion 63, and a second regulating wall portion 64.

The cover 60 is formed integrally with the terminal accommodation portion 40, i.e., has a configuration that is integral with the housing 11. The cover 60 is configured to be capable of covering a top side (opposite side from the bottom portion 41) in the Z direction of the terminal accommodation portion 40 by way of a hinge 65 that is provided near a top end portion (opposite from the bottom portion 41) of the first wall portion 42a of the terminal accommodation portion 40. The hinge 65 is a flexible site that is formed so as to be integral with each of the terminal accommodation portion 40 and the cover 60, and also is formed to be thinner than a plate thickness of the cover main body 61 and the first wall portion 42a of the terminal accommodation portion 40. The cover 60 is capable of rotating between an open position illustrated in FIG. 3 and a closed position illustrated in FIG. 2, with rotation centered about the hinge 65 (rotation axis lying along the X direction).

As illustrated in FIGS. 2 to 4 and FIG. 6, the engagement portion 62 is provided on a leading edge (edge on the opposite side from the hinge 65) of the cover main body 61. The engagement portion 62 has substantially a U-like frame shape and includes an engagement hole 62a at the center thereof. The engagement portion 62 is capable of engaging with a projection 44 that is formed near the opposite of the bottom portion 41 on the second wall portion 42b. Accordingly, the cover 60 is capable of maintaining the closed state.

The first regulating wall portion 63 is configured so as to have substantially a U-like frame shape that extends from an X-direction edge portion in a direction that is substantially orthogonal to the cover main body 61. The first regulating wall portion 63 is formed such that, when the cover 60 is in the closed state, a forefront end portion thereof extends in the X direction to a position that overlaps with the flanges 51a. Accordingly, the first regulating wall portion 63 can abut the flange 51a in the X direction and positional shifting of the module-side terminal 14 in the X direction is inhibited. In addition, the first regulating wall portion 63 extends into the vicinity of the first flat plate portion 51, and therefore can abut the first flat plate portion 51 of the module-side terminal 14 in the Z direction and positional shifting of the module-side terminal 14 in the Z direction is inhibited.

The second regulating wall portion 64 is formed at a position facing the engagement portion 62 in the Y direction. The second regulating wall portion 64 is formed at the same position in the Y direction as one of the pair of flanges 51a. Therefore, the second regulating wall portion 64 can abut the flange 51a in the Z direction and positional shifting of the module-side terminal 14 in the Z direction is inhibited. Accordingly, the module-side terminal 14 (second flat plate portion 52) can be constrained from slipping out of the opening 43.

Operations of the present embodiment are now described. The battery wiring module 10 according to the present embodiment is arranged on the secondary battery BT, which includes the plurality of battery cells C. The module-side terminals 12 and 14 of the battery wiring module 10 are connected to the bus bars B1 and B2, which connect the positive electrode terminals and negative electrode terminals of the battery cells C to each other, the battery cells C being aligned in the X direction. One end of the wire 13 is connected to the module-side terminals 12 and 14, and the other end of the wire 13 is connected to a battery monitor ECU (not shown in the drawings). The battery monitor ECU makes it possible to monitor voltage of the battery cell C.

Also, in the housing 11 of the battery wiring module 10, the module-side terminal 14 that is accommodated in the terminal accommodation portion 40 is configured to be capable of abutting the bottom portion 41 and the third wall portion 42c that are provided to the terminal accommodation portion 40, or of abutting in the X direction and Z direction, and displacement of the module-side terminal 14 is regulated. Similarly, the module-side terminal 14 is configured to be capable of abutting the first and second regulating wall portions 63 and 64 of the cover 60 in the X direction and Z direction, and displacement of the module-side terminal 14 is regulated.

Effects of the present embodiment are now listed.
(1) By including the bottom portion 41, the third wall portion 42c, and the first and second regulating wall portions 63 and 64 as regulating portions on both the terminal accommodation portion 40 and the cover 60, positional shifting of the module-side terminal 14 can be inhibited.

(2) The present embodiment includes the bottom portion 41 and the third wall portion 42c, which serve as accommodation-side regulating portions capable of abutting the module-side terminal 14 in the opening direction on the opening 43 side, and the first and second regulating wall portions 63 and 64, which serve as cover-side regulating portions capable of abutting the module-side terminal 14 in a direction that intersects (is orthogonal to) the opening direction of the opening 43. Accordingly, the module-side terminal 14 can be regulated from multiple directions, and positional shifting of the module-side terminal 14 can be inhibited.

(3) By configuring the cover 60 to be integral with the housing 11, an increase in the number of components can be inhibited.

(4) Also, the present embodiment has a structure in which the module-side terminal 14 is arranged between the cover 60 and the terminal accommodation portion 40, and therefore a load on the module-side terminal 14 when attaching the module-side terminal 14 can be constrained and deformation of the module-side terminal 14 can be inhibited. Accordingly, a hard resin material can also be used as the housing 11.

The embodiment described above can also be modified as follows. The embodiment described above and the modifications that follow may be combined with each other so long as they do not contradict each other technically.

In the embodiment described above, the bottom portion 41 and the third wall portion 42c are adopted as accommodation-side regulating portions, and the first and second regulating wall portions 63 and 64 are adopted as cover-side regulating portions, but the present invention is not limited to this. A configuration such as that illustrated in FIGS. 7 and 8 may also be adopted.

Figure 7:
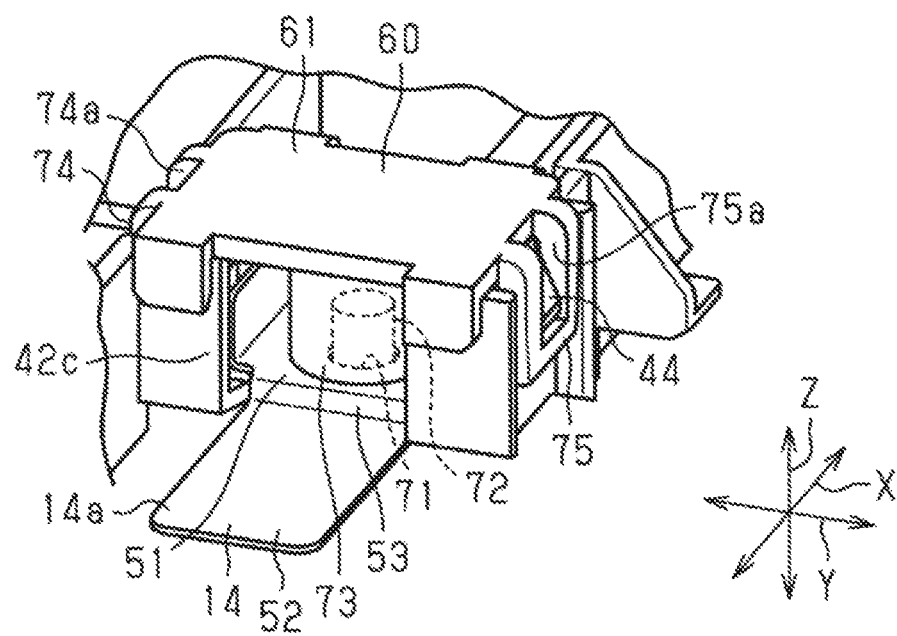
FIG. 7 is a perspective view of a portion of a battery wiring module according to a modification.
Figure 8:
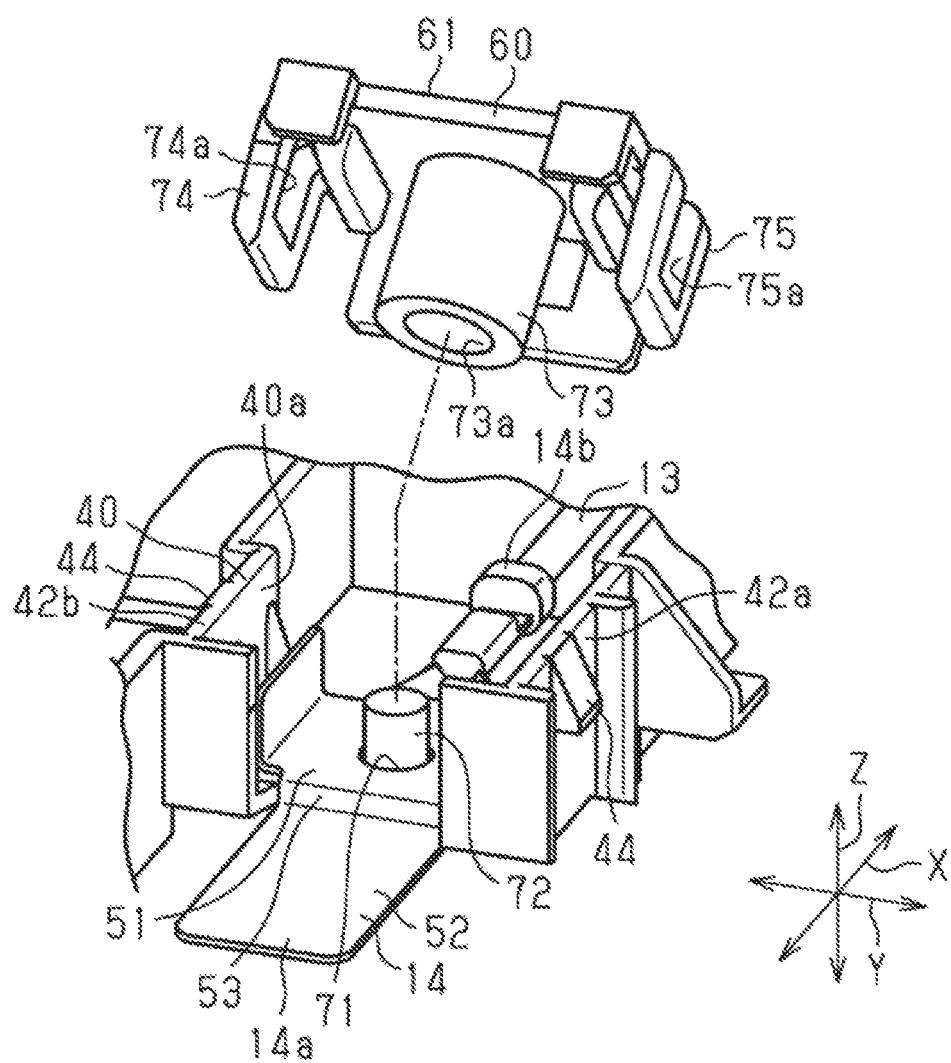
FIG. 8 is a perspective view of a portion of the battery wiring module according to the same modification.

In the module-side terminal 14 illustrated in FIGS. 7 and 8, the first flat plate portion 51 includes a hole 71. The bottom portion 41 of the terminal accommodation portion 40 includes a round columnar pin portion 72 as a terminal-side accommodation portion that is inserted through the hole 71 and extends upward in the Z direction. By inserting the pin portion 72 through the hole 71 of the module-side terminal 14, positional shifting of the module-side terminal 14 in the X direction and Y direction is inhibited.

The cover 60 includes an extended tube portion 73 that extends from the cover main body 61 and the pin portion 72 can be inserted through the interior thereof. Also, the cover 60 includes two engagement portions 74 and 75. Each of the engagement portions 74 and 75 has substantially the same configuration as the engagement portion 62 according to the embodiment described above, having a substantially U-like frame shape and including an engagement hole 74a and 75a, respectively, at the center thereof. The engagement portions 74 and 75 are capable of engaging with the projection 44 that is formed near the opposite of the bottom portion 41 on the second wall portion 42b and the first wall portion 42a. Accordingly, the cover 60 is capable of maintaining the closed state. In the present example, the cover 60 is configured to be separate from the terminal accommodation portion 40.

When the cover 60 is in the closed state, the extended tube portion 73 of the cover 60 extends downward in the Z direction from the cover main body 61 (toward the module-side terminal 14) and the pin portion 72 is inserted through an insertion hole 73a on the interior thereof. At this point, a forefront end portion of the extended tube portion 73 in the extension direction is able to abut the module-side terminal 14. In other words, the module-side terminal 14 can be constrained from slipping off of the pin portion 72 by the extended tube portion 73.

As described above, positional shifting of the module-side terminal 14 in the Z direction, X direction, and Y direction can be inhibited by the pin portion 72, which serves as a pin-shaped terminal-side accommodation portion that is inserted through the hole 71 of the module-side terminal 14, and the extended tube portion 73, which serves as a cover-side accommodation portion that regulates the module-side terminal 14 from slipping out of the terminal accommodation portion 40.

In the example described above, the pin portion 72 is depicted as having a round columnar shape, but the pin portion 72 may also have a polygonal columnar shape. Furthermore, in the above description, a single pin portion 72 is provided, but a plurality of pin portions 72 may be provided. A configuration is also possible in which, when a plurality of pin portions 72 are provided, the plurality of pin portions 72 are inserted through the interior of a single extended tube portion 73. A configuration is also possible in which extended tube portions 73 are provided in accordance with the number of pin portions. In addition, an amount of projection of the pin portion 72 may be modified as appropriate. For example, a configuration may be adopted in which a communication hole that communicates with the insertion hole 73a is provided to the cover main body 61 and the pin portion projects (is exposed) outside through the communication hole.

Figure 9:
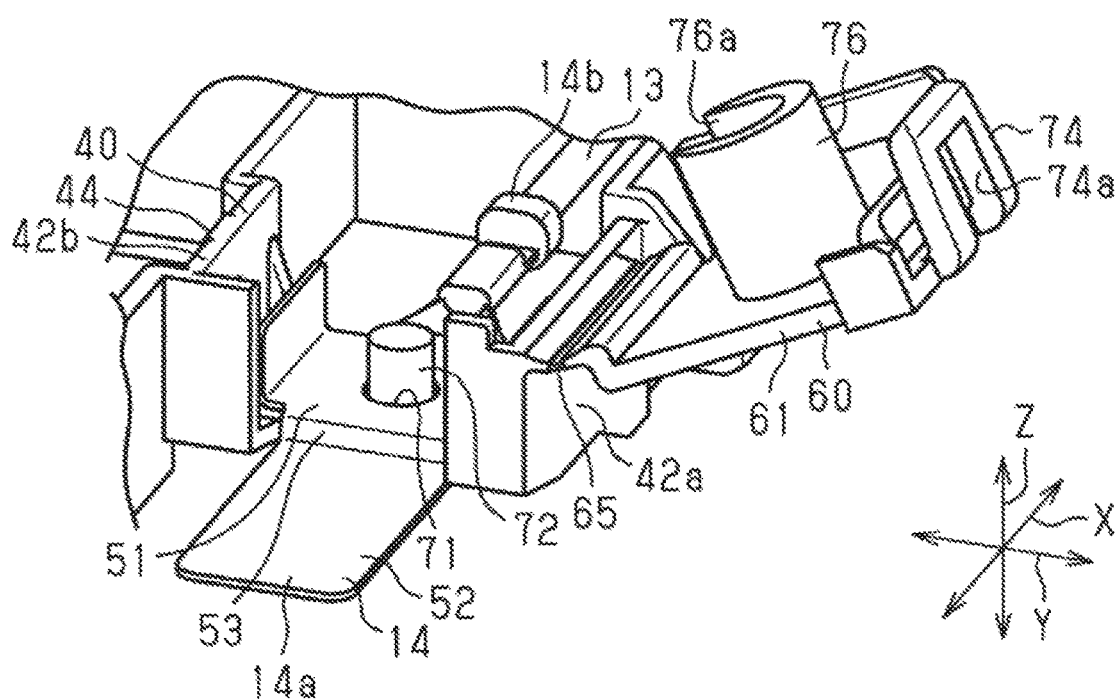
FIG. 9 is a perspective view of a portion of a battery wiring module according to a modification.

In the example described above, the terminal accommodation portion 40 and the cover 60 are configured as separate structures, but as illustrated in FIG. 9, the terminal accommodation portion 40 and the cover 60 may also be configured integrally by way of the hinge 65. As illustrated in FIG. 9, the cover 60 includes an extended portion 76 on the cover main body 61. The extended portion 76 is configured to have a substantially U-like half-cylinder shape (half-pipe shape) with an opening 76a that opens toward the hinge 65 side. By having the opening 76a be open toward the hinge 65 side, the extended portion 76 can be constrained from interfering with the pin portion 72.

In the embodiment described above, a configuration is described in which the cover 60 is provided to the terminal accommodation portion 40, which is positioned at the X-direction end portion. However, a cover may also be provided to the other terminal accommodation portion 30 and the positional shifting of the module-side terminals 12 may be inhibited.

In the embodiment described above, a configuration is adopted in which the second regulating wall portion 64 is provided so as to correspond to only one of the pair of flanges 51a. However, second regulating wall portions 64 may also be respectively provided to positions corresponding to both of the pair of flanges 51a. In addition, at this point, a configuration is also possible in which the second regulating wall portions 64 are connected to each other with a connecting wall portion that is flush with the second regulating wall portions 64. By providing the connecting wall portion, even when the second regulating wall portions 64 and the flanges 51a shift in the Y direction, the flanges 51a can be abutted by the connecting wall, and therefore positional shifting of the module-side terminal 14 in the Z direction can be inhibited.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A battery wiring module comprising:
    a module-side terminal that is electrically connected to a bus bar that connects battery terminals of a plurality of battery cells to each other;
    a wire having one end connected to the module-side terminal; and
    a housing that accommodates the wire and the module-side terminal,
    wherein the housing is provided with a terminal accommodation portion accommodating the module-side terminal and having an opening through which the module-side terminal is introduced,
    the terminal accommodation portion includes an accommodation-side regulating portion that regulates displacement of the module-side terminal,
    a cover that seals the opening of the terminal accommodation portion includes a cover-side regulating portion that regulates displacement of the module-side terminal at a different position from that of the accommodation-side regulating portion, and
    the module-side terminal passes through the terminal accommodation portion so that opposing ends of the module-side terminal in a direction along a longitudinal direction of the wire are disposed outside of the cover when the cover seals the opening of the terminal accommodation portion.

2. The following is an examiner's statement of reasons for allowance: the prior art fails to provide, teach or suggest the module-side terminal passes through the terminal accommodation portion so that opposing ends of the module-side terminal in a direction along a longitudinal direction of the wire are disposed outside of the cover when the cover seals the opening of the terminal accommodation portion.

3. A battery wiring module comprising:
    a module-side terminal that is electrically connected to a bus bar that connects battery terminals of a plurality of battery cells to each other;
    a wire having one end connected to the module-side terminal; and
    a housing that accommodates the wire and the module-side terminal,
    wherein the housing is provided with a terminal accommodation portion accommodating the module-side terminal and having a first opening through which the module-side terminal is introduced,
    the terminal accommodation portion includes an accommodation-side regulating portion that regulates displacement of the module-side terminal,
    a cover that seals the first opening of the terminal accommodation portion includes a cover-side regulating portion that regulates displacement of the module-side terminal at a different position from that of the accommodation-side regulating portion,
    wherein the housing includes the terminal accommodation portion that accommodates the module-side terminal, the terminal accommodation portion includes a second opening which is configured to expose a forefront end portion of the module-side terminal to an exterior, as well as the accommodation-side regulating portion that can abut the module-side terminal in an opening direction of the second opening, and
    the cover includes the cover-side regulating portion that can abut the module-side terminal in a direction that intersects with the opening direction of the second opening.

4. The battery wiring module according to claim 3, wherein the cover is configured to be integral with the housing.

5. A battery wiring module comprising:
    a module-side terminal that is electrically connected to a bus bar that connects battery terminals of a plurality of battery cells to each other;
    a wire having one end connected to the module-side terminal; and
    a housing that accommodates the wire and the module-side terminal,
    wherein the housing is provided with a terminal accommodation portion accommodating the module-side terminal and having an opening through which the module-side terminal is introduced,
    the terminal accommodation portion includes an accommodation-side regulating portion that regulates displacement of the module-side terminal,
    a cover that seals the opening of the terminal accommodation portion includes a cover-side regulating portion that regulates displacement of the module-side terminal at a different Position from that of the accommodation-side regulating portion,
    wherein the terminal accommodation portion includes the accommodation-side regulating portion having a pin shape that extends from a bottom portion of the terminal accommodation portion and is configured to be inserted through a hole in the module-side terminal, and the cover includes the cover-side regulating portion that regulates the module-side terminal from slipping off of the accommodation-side regulating portion.

6. The battery wiring module according to claim 5, wherein the cover is configured to be integral with the housing.

* * * * *